(12) United States Patent
Branson et al.

(10) Patent No.: US 9,391,830 B2
(45) Date of Patent: *Jul. 12, 2016

(54) DYNAMIC STREAM PROCESSING WITHIN AN OPERATOR GRAPH

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/627,608

(22) Filed: Sep. 26, 2012

(65) Prior Publication Data

US 2014/0089929 A1 Mar. 27, 2014

(51) Int. Cl.
- *G06F 15/16* (2006.01)
- *H04L 29/08* (2006.01)
- *H04L 29/06* (2006.01)

(52) U.S. Cl.
CPC .......... *H04L 29/08135* (2013.01); *H04L 69/22* (2013.01)

(58) Field of Classification Search
CPC ... H04L 65/60; H04L 29/06476; H04L 69/08; H04L 43/08; H04L 43/16; H04L 47/10; H04L 47/12; H04L 47/22; H04L 65/608; G06F 17/30516; G06F 9/5083
USPC .......................... 709/230, 231, 232, 234, 235
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,639,809 B2 | 1/2014 | Branson et al. | |
| 2008/0168179 A1* | 7/2008 | Gu | G06F 17/30985 709/231 |
| 2009/0248749 A1* | 10/2009 | Gu | G06F 17/30985 |
| 2009/0313614 A1 | 12/2009 | Andrade et al. | |
| 2010/0042606 A1* | 2/2010 | Srivastava | G06F 17/30489 707/718 |
| 2011/0072489 A1* | 3/2011 | Parann-Nissany | G06F 21/62 726/1 |
| 2011/0213802 A1 | 9/2011 | Singh et al. | |
| 2012/0047505 A1* | 2/2012 | Branson | G06F 17/30563 718/100 |
| 2012/0218268 A1 | 8/2012 | Accola et al. | |
| 2014/0089373 A1 | 3/2014 | Branson et al. | |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

(Continued)

*Primary Examiner* — Edward Kim
(74) *Attorney, Agent, or Firm* — Jared L. Montanaro; Feb Cabrasawan

(57) ABSTRACT

A method and system for processing a stream of tuples in a stream-based application is disclosed. The method may include a first stream operator determining whether a requirement to modify processing of a first tuple at a second stream operator exists. The method may provide for associating an indication to modify processing of the first tuple at the second stream operator if the requirement exists.

15 Claims, 7 Drawing Sheets

(56) References Cited

OTHER PUBLICATIONS

Santosuosso et al., "Management System for Processing Streaming Data", Filed Jul. 26, 2011. U.S. Appl. No. 13/190,810.

IBM, "IBM Streams Processing Language Specification", IBM InfoSphere Streams Version 2.0.0.4., © IBM Corporation 2009, 2012. http://publib.boulder.ibm.com/infocenter/streams/v2r0/topic/com.ibm.swg.im.infosphere.streams.product.doc/doc/IBMInfoSphereStreams-SPLLanguageSpecification.pdf.

* cited by examiner

DYNAMIC STREAM PROCESSING WITHIN AN OPERATOR GRAPH

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a stream-based application. The first stream operator may determine whether a requirement to modify processing of a first tuple at a second stream operator exists. The method may provide for associating an indication to modify processing of the first tuple at the second stream operator if the requirement exists.

Another embodiment is directed to a system for processing a stream of tuples in a stream-based application. The system may include a plurality of stream operators. The system may include a first stream operator that may determine whether a requirement to modify processing of a first tuple at a second stream operator exists. In addition, the first stream operator may associate an indication to modify processing of the first tuple at the second stream operator if the requirement exists.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
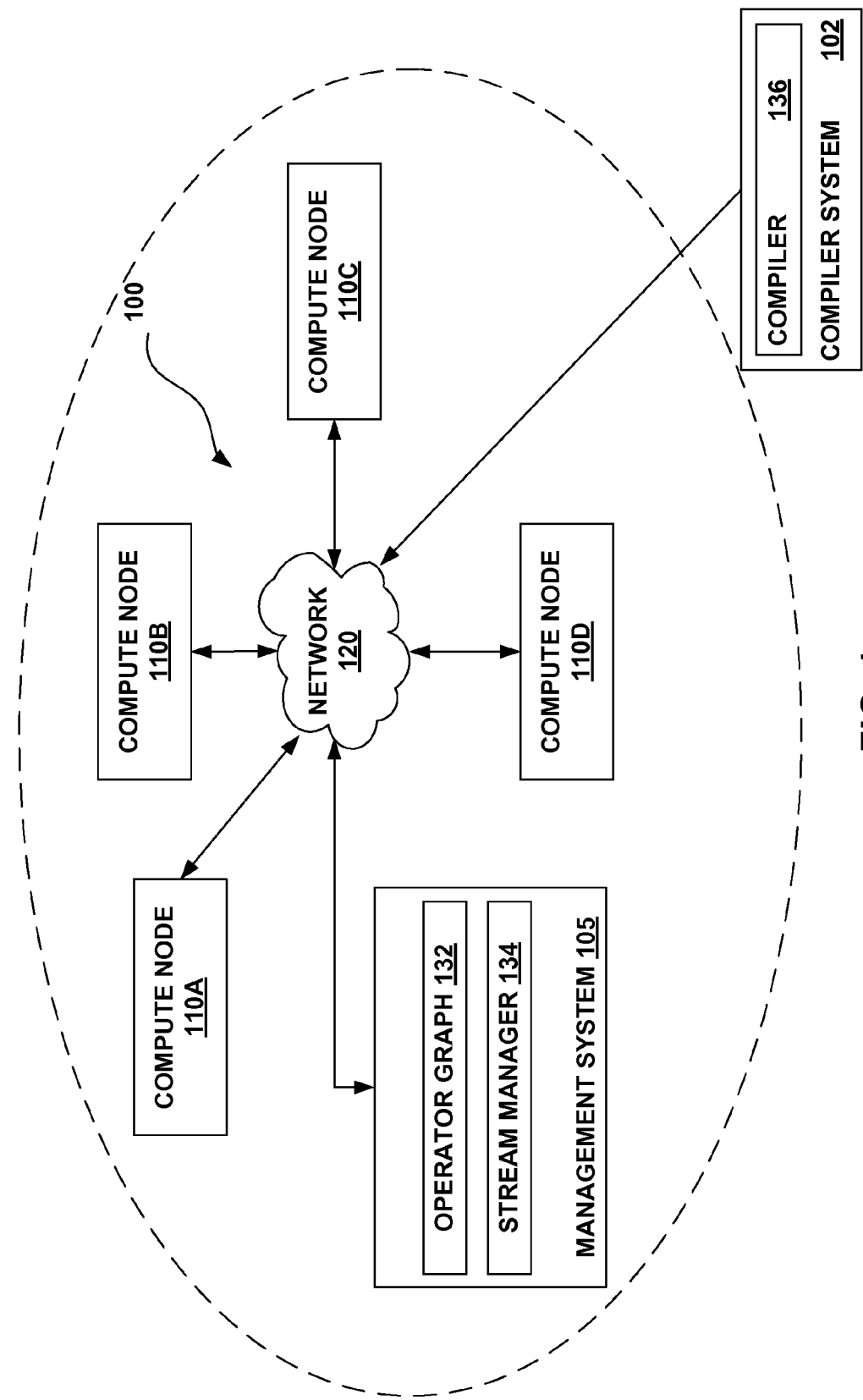
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with a thing. Examples of attributes may be any of a variety of different types, e.g., integer, float, Boolean, string, etc. The attributes may be ordered. A tuple may be extended by adding one or more additional attributes to it. In addition to attributes associated with a thing, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments disclosed herein are directed to methods and apparatuses that enhance the ability of a stream operator to efficiently and rapidly process a received data stream. In one embodiment, it may be determined that a particular stream operator or a particular group of stream operators modify processing of tuples if a particular requirement exists. An indication may be associated with these tuples. The indication instructs the particular stream operators that the tuples meeting this requirement are to remain in the data stream, but the processing is to be modified. Modification of processing may, for example, include skipping processing of the tuple in some embodiments. The stream operator may rapidly examine a received tuple to determine if the indicator is associated with the tuple, and if it is associated, the operator may forward the tuple to a next stream operator without having to take the time to process the tuple.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
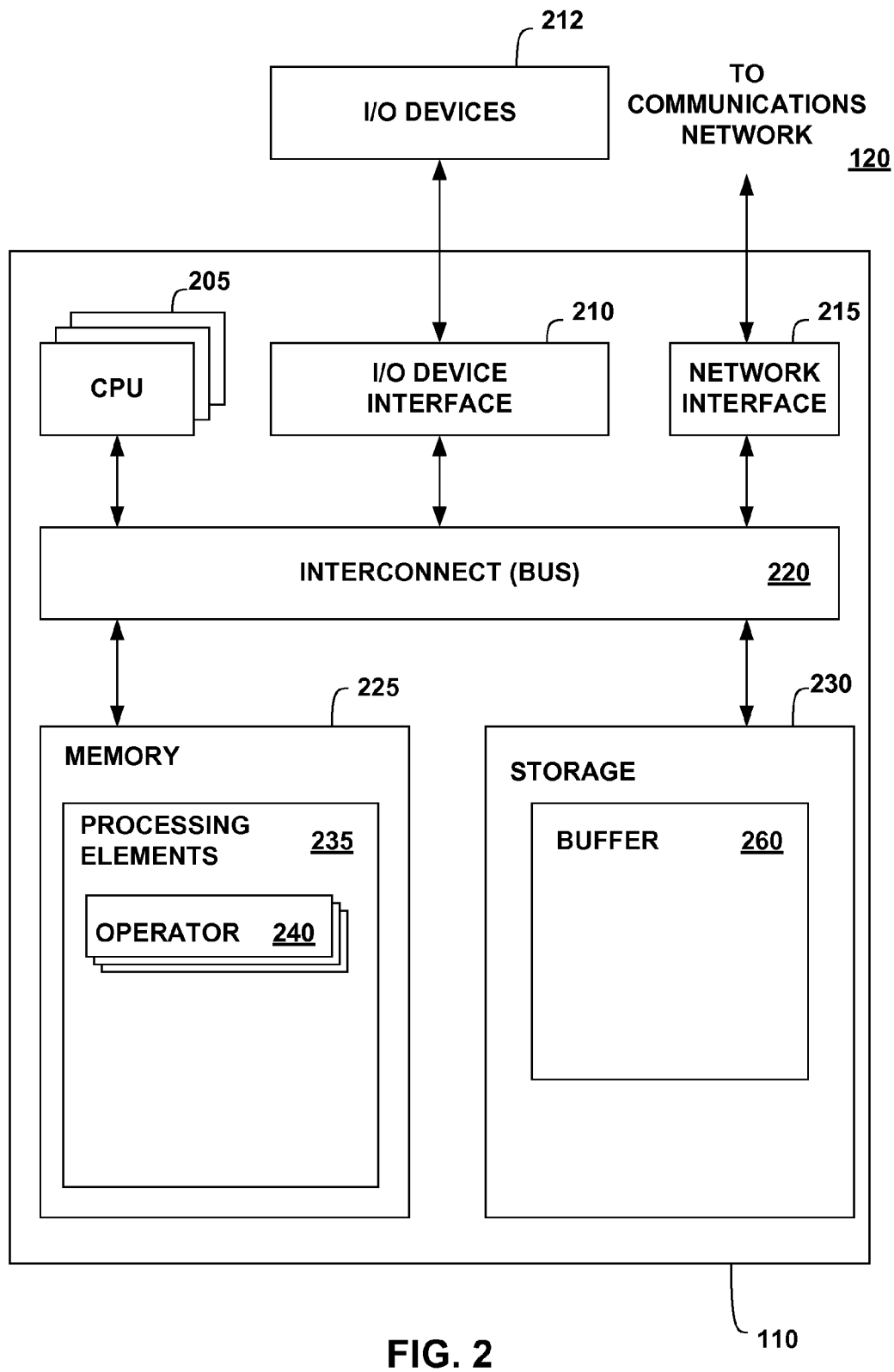
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
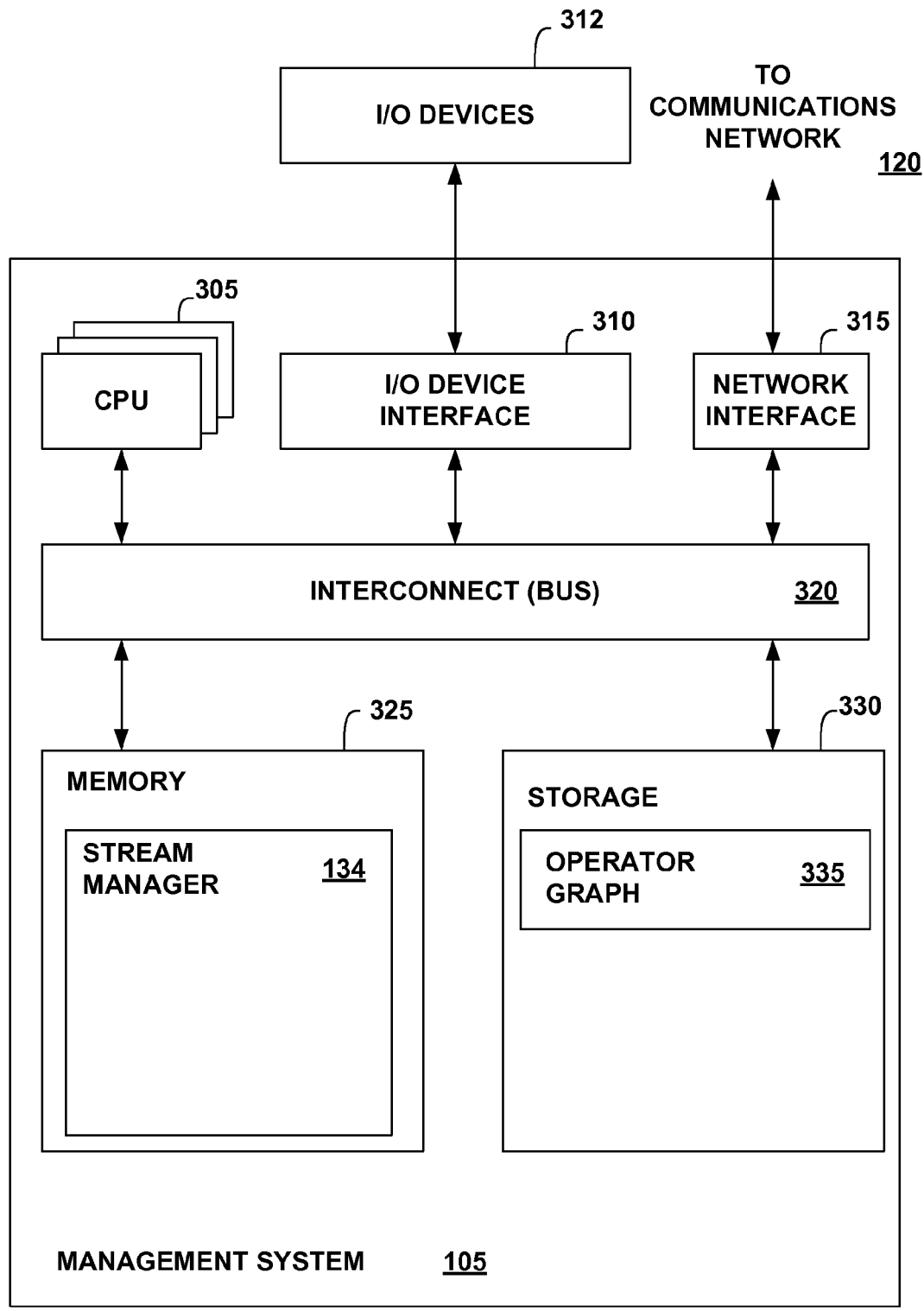
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

Figure 4:
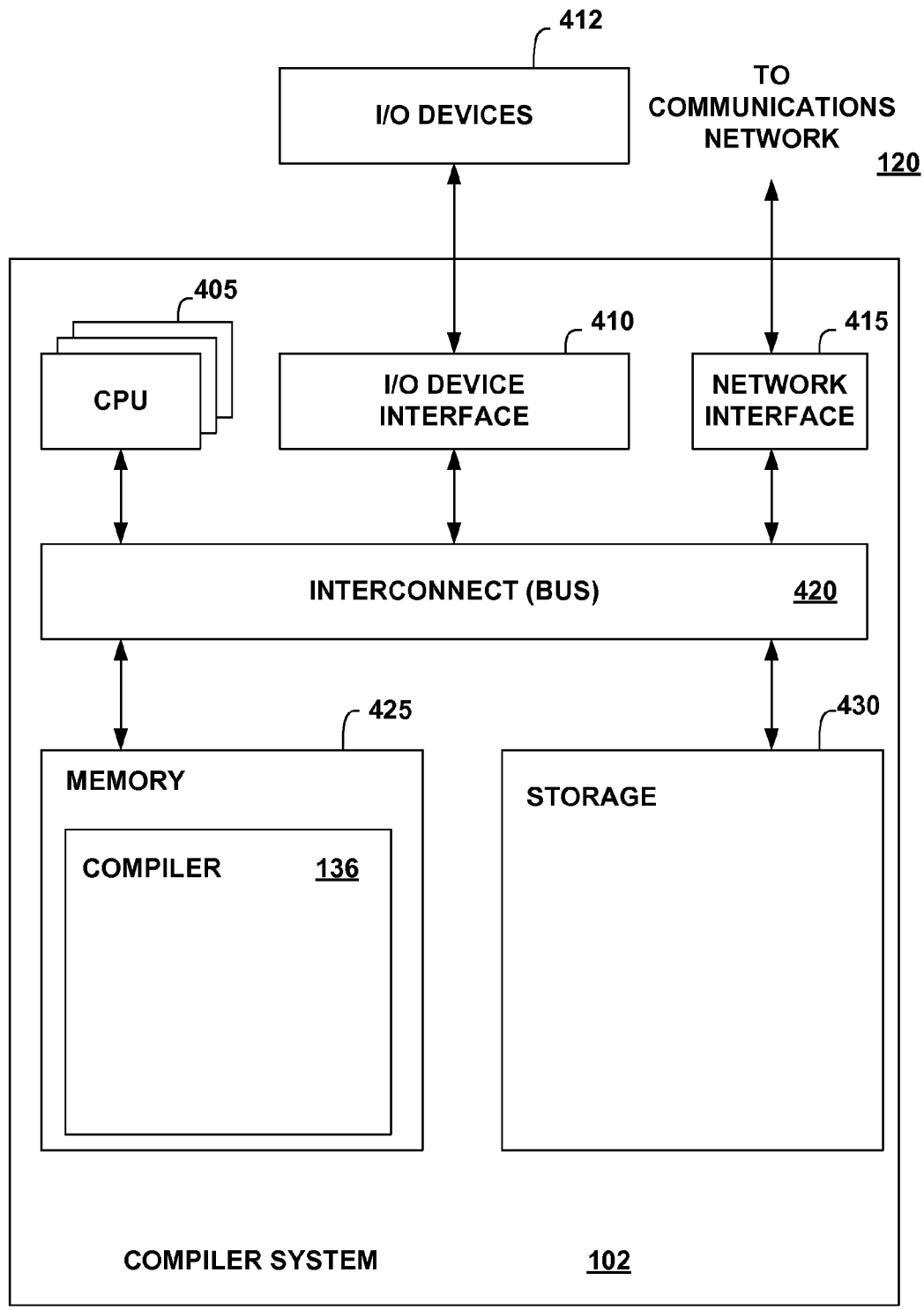
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
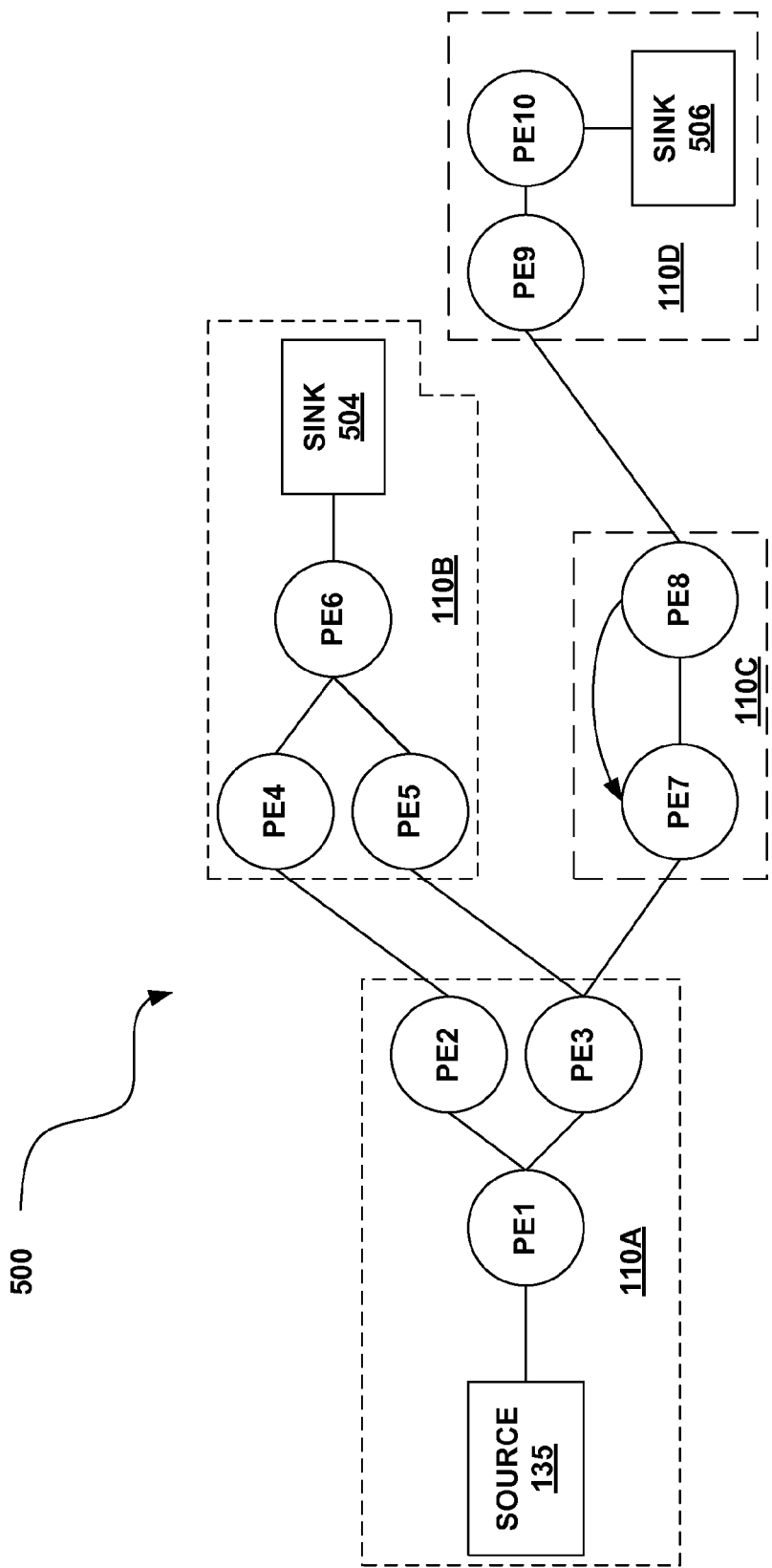
FIG. 5 illustrates a more detailed view of an operator graph in a stream-based application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
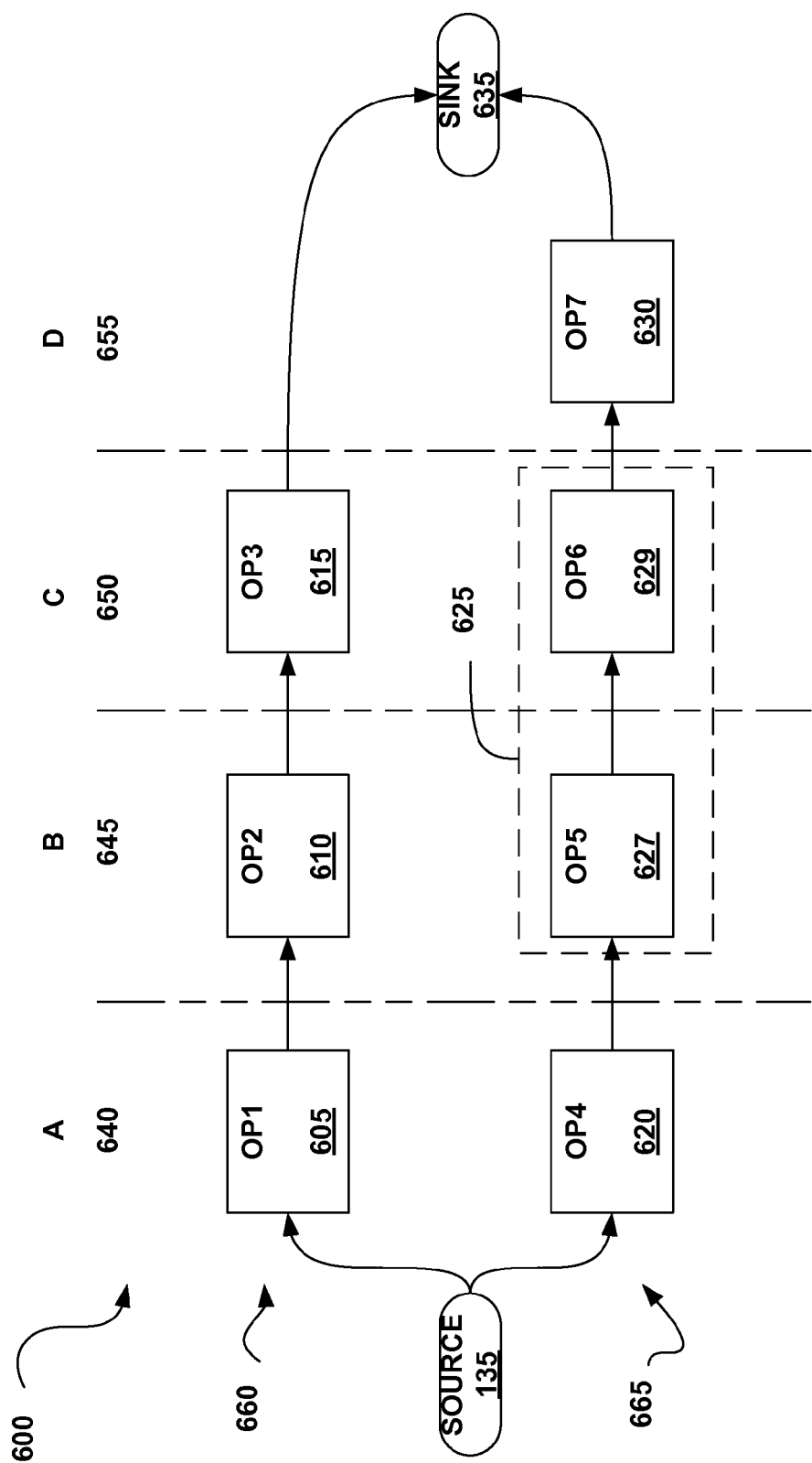
FIG. 6 illustrates a more detailed view of dynamic processing of a data stream according to various embodiments.

FIG. 6 shows a more detailed view of an operator graph 600 of a streaming application in which processing of incoming tuples may be dynamically modified, according to some embodiments. Operator graph 600 shows two different execution paths: execution path 660 and execution path 665. Execution path 660 contains stream operators 605, 610, and 615; execution path 665 contains stream operators 620, 627, 629, and 630. Each of the execution paths may contain its own stream operators in some embodiments and may share stream operators with other execution paths in other embodiments. Execution paths may, for example, complete different types of processing on a given tuple, or they may process different aspects of an incoming tuple. In some embodiments, execution path 660 may be the only execution path, but in others execution path 665 may be the only execution path. As shown in FIG. 6, source 135 may transmit a stream of tuples along execution path 660 and execution path 665. In some embodiments, the operator graph may have more execution paths. In other embodiments, the operator graph may have fewer execution paths.

FIG. 6 illustrates various embodiments in which processing at a stream operator, group of stream operators, or level of stream operators may be dynamically modified. The various embodiments are depicted in one operator graph, although in some embodiments, some or all of these methods may be used. In some embodiments, dynamic modification of processing may include outputting a tuple without any processing. In other embodiments, dynamic modification of processing may include outputting a tuple and skipping a portion of the processing operations at one or more stream operators. The embodiments described herein may allow for processing to be modified at either a stream operator, group of stream operators, or level of stream operators. In FIG. 6, stream operator group 625 may represent a group of stream operators according to some embodiments. Levels A-D 640, 645, 650, and 655 may represent levels of stream operators in some embodiments. Operator group 625 and levels A-D 640, 645, 650, and 655 are used herein as examples of grouping stream operators that may occur when dynamically modifying processing within an operator graph.

Execution paths 660 and 665 may run independently of each other, but their respective operators may still be hosted on the same computer hardware that supports the stream computing application. For example, stream operator 605 and stream operator 610 may execute on the same compute node as stream operator 620. That is, stream operators from different execution paths may share the same network interface 215, memory 225, or CPU 205, of the compute node 110 as shown in FIG. 2.

According to some embodiments, execution path 660 may transmit an input data stream from source 135 to stream operator 605. Stream operator 605 may process the tuples from the input data stream and may generate an output data stream. The output data stream generated by stream operator 605 may become the input data stream for stream operator 610. Stream operator 605 may determine that a requirement exists for one or more particular stream operators to output the particular tuple without processing it.

Stream operator 605 may check for various types of requirements. For example, in some embodiments, the requirement may be to check whether a particular attribute value is present in the tuple. In other embodiments, the stream operator 605 may check whether a particular attribute value is missing from the tuple. In yet other embodiments, the requirement may be checking a time-based criterion, such as, for example, whether a tuple has been in the operator graph longer than a specified amount of time or exceeds a threshold period of time.

When stream operator 605 determines that a requirement exists for a tuple, the stream operator 605 may associate an indication with the tuple that one or more particular stream operators, e.g., operator 610, should not process this particular incoming tuple. In some embodiments, the indication may instruct particular stream operators that the tuples are to remain in the data stream without being processed. In other embodiments, the indication may instruct particular stream operators that the tuples are to remain in the data stream with limited processing. An example of limited processing is a situation in which a stream operator is configured with a plurality of processing operations, and less than all of this plurality of operations is to be skipped. The indication may be associated with a tuple by adding or modifying header or trailer information for the tuple, such as, for example, metadata for the tuple. The indication may be a tuple that is output to the downstream stream operator indicating that the next tuple, next group of tuples, next tuples within a period of time, or combinations thereof, received should not be processed, according to some embodiments.

Stream operator 610 may receive the input and read the indication that it should not process the particular tuple generated by stream operator 605. A receiving stream operator, such as stream operator 610, may be capable of independently determining that it should not process the particular tuple by evaluating one or more attributes of the tuple, however, reading the indication may result in faster processing than evaluating by the stream operator. The operator graph may, in some embodiments, include a processing precedence order. This may, for example, provide that the sending stream operator's (stream operator 605, for example) processing requirement may supersede the receiving stream operator's (stream operator 610, for example) own logic, despite the receiving stream operator being configured with its own processing requirements. As one example, stream operator 610 may be configured to discard a tuple having a particular attribute or attribute value, but sending stream operator 605 may have a requirement that these tuples not be discarded. In this example, the requirement of sending stream operator 605 may supersede the requirement of receiving stream operator 610. Alternatively, the requirement of receiving stream operator 610 may supersede the requirement of sending stream operator 605. In some embodiments, stream operator 610 may then output a corresponding tuple to stream operator 615 for additional processing. The corresponding tuples generated by stream operator 610 may have the same attribute values as the input tuples it received. Stream operator 615 may process the incoming tuple in some embodiments, and may generate an output data stream that it transmits to sink 635.

In another embodiment, the stream operator 605 may associate an indication with the tuple modifying processing of the tuple at one or more particular stream operators, e.g., operator 610, when the requirement is a performance requirement or condition. A performance requirement or condition may be, for example, a maximum duration of time within which a stream operator, e.g., stream operator 610, may be required to complete its processing. In other embodiments, a performance requirement or condition may be a maximum number of exceptions that can occur, a maximum number of iterations a process may run, or other similar performance-based criteria. The indication may modify processing at stream operator 610 such that processing may be attempted at stream operator 610 until the performance requirement or condition is violated, at which point stream operator 610 may output a tuple matching the input tuple it received from stream operator 605.

According to some embodiments, execution path 665 may include transmitting an input data stream from source 135 to stream operator 620. Stream operator 620 may process the input tuples from the input data stream and output tuples. The output tuples of stream operator 620 may become input tuples for stream operator 627. Stream operator 620 may determine that a group of stream operators, e.g., group 625, should modify processing on tuples where a particular requirement exists. Stream operator group 625 may include stream operators 627 and 629. An indication may be associated with a tuple output by stream operator 620 that corresponds with a tuple received by operator 620 for which the particular requirement exists that indicates that operators in the stream operator group 625 should not process the tuple. Stream operator 627 may receive the particular tuple (with the associated indication) output by operator 620 and output a corresponding tuple to stream operator 629 without processing the tuple. This tuple output by stream operator 627 to stream operator 629 may include the associated indication. Upon receipt of a tuple having an associated indication that the particular requirement exists, stream operator 629, like stream operator 627, may output a corresponding tuple without processing the tuple. Stream operator 629 may receive the tuple from stream operator 627, inspect it for the associated indication, and output a corresponding tuple that may, in some embodiments, become an input tuple for stream operator 630. Unlike the stream operators in stream operator group 625, stream operator 630 may not receive any indication that the tuple should not be processed further. Alternatively, stream operator 630 may inspect an associated indication that the tuple should not be processed further, but ignore the indication upon determining that the indication is only applicable to a stream operator group that does not include stream operator 630. Stream operator 630 may process the input tuple and output a tuple. The output tuple of stream operator 630 may be transmitted to sink 635 in some embodiments.

According to some embodiments, operator graph 600 may be divided into multiple processing levels. Each level may contain some amount of processing. A level may be defined as a number of subsequent operators from a particular operator. For example in FIG. 6, stream operator 615 may be considered to be two levels from stream operator 605. A level may correspond to a single or more than one stream operator in an execution path. Levels may be either on the same compute node or on different compute nodes. In another embodiment, a level may correspond to hardware. That is, a level may represent a specified piece of hardware. A specified piece of hardware may include, for example, one or more physical machines, one or more physical racks of machines, or one or more cores of a processor. In other embodiments, a level may even represent a physical location of hardware. For example, hardware may be distributed across different locations and a level may represent one or more physical locations.

In the example of FIG. 6, source 135 generates an input data stream that is transmitted to both stream operator 605 and stream operator 620. Both stream operator 605 and stream operator 620 are part of Level A 640. In some embodiments, a stream operator in Level A 640 may process the incoming tuple from source 135, determine that one or more downstream levels of stream operators should not process the tuple, and associate an indication with the tuple that the tuple should remain in the data stream without being processed. In other words, an indication with a tuple to modify processing may specify a number of operators subsequent to a particular stream operator, i.e., one or more levels. For example, stream operator 605 may associate an indication that two levels of processing should be modified, which in turn may cause stream operators 610 and 615 to output the particular tuple without processing it.

In some embodiments, this may mean that stream operators in Level B 645 may receive an input tuple that carries an indication that Level B 645 should not process the incoming tuple, but that tuple should remain in the data stream. A stream operator in Level B 645 may then output a tuple that is the same as the input tuple and transmit that output tuple to the next level in the operator graph, i.e., either Level C 650 or Level D 655.

Figure 7:
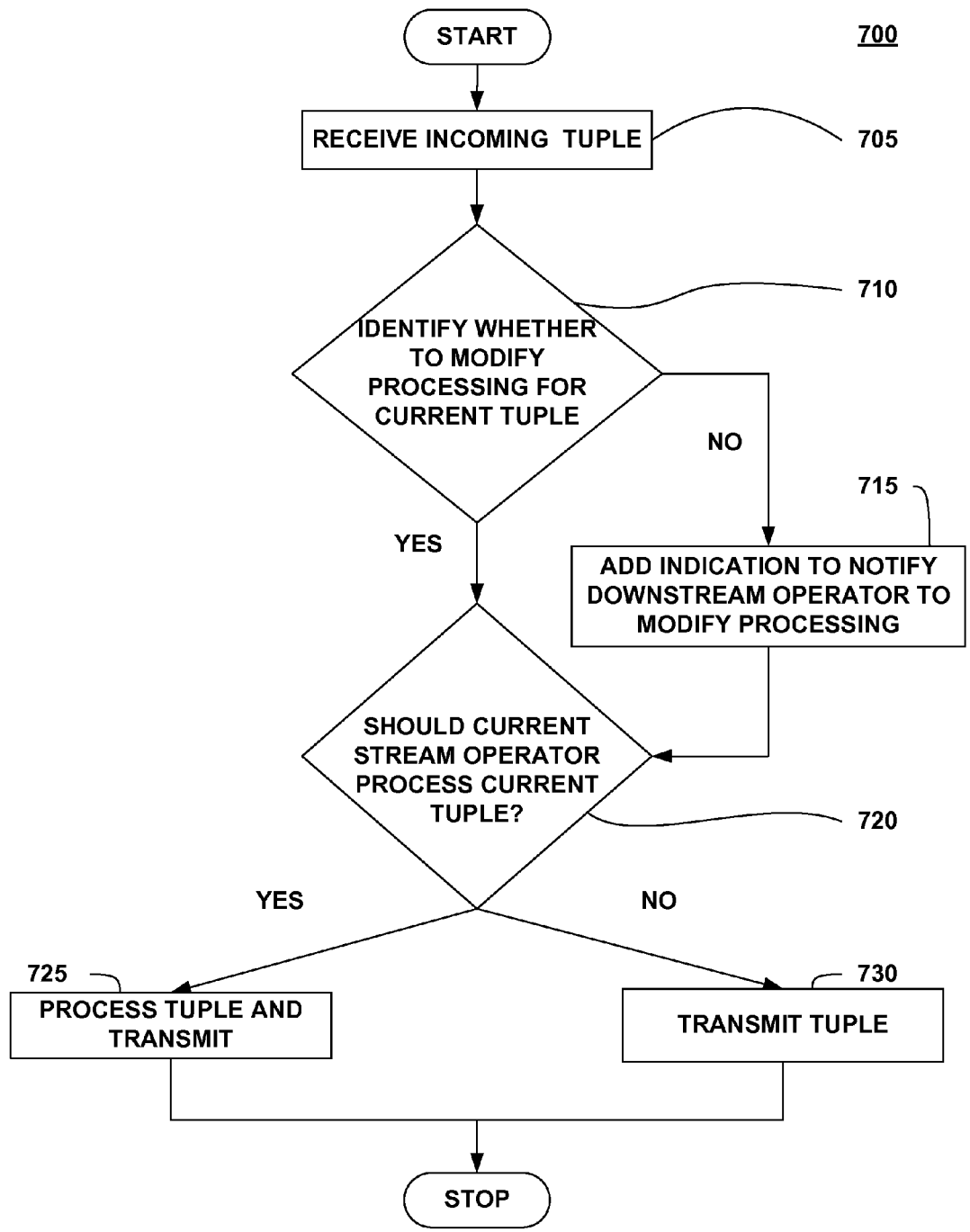
FIG. 7 illustrates a method for dynamically modifying the processing of tuples in a streaming application according to various embodiments.

FIG. 7 illustrates a method 700 for dynamically modifying processing of tuples in a streaming application, according to some embodiments. As shown, the method 700 begins at operation 705, when a stream operator receives an input tuple. At operation 710, a stream operator may determine whether a requirement to modify processing of a particular tuple by a second stream operator exists.

In some embodiments, the decision to not process a tuple at a downstream stream operator, group of stream operators, or level of stream operators may be, for example, because of unusable data. For example, an application may receive a data stream from a tollbooth monitoring system. Each tuple in the stream may contain an attribute that is an image of the entire vehicle, an attribute that is an image of the passenger compartment, and an attribute that is an image of the license plate. The operator graph may include three stream operators, one to determine the type of the vehicle (either passenger or commercial), one to determine how many passengers are in the car, and one to determine or read the license plate number. It may be possible to determine in a first stream operator, e.g., the operator that determines vehicle type, that the image of the passenger compartment is not likely to yield a passenger count prior to the tuple reaching the stream operator at which the passenger count is determined (for example, if there was a glare or some other reason the image was corrupted). Because the second attribute may be unusable, the first stream operator may associate an indication with the tuple instructing the second stream operator to modify its processing and output a corresponding tuple. In that case, it may be possible to modify the processing so that a second stream operator determining the passenger count outputs a corresponding tuple without processing it, and the tuple is retained in the application. Alternatively, the second stream operator may begin processing but abort its processing if a passenger count determination is not made within a specified time or a specified number of iterations of an image processing method. The application may continue processing with the stream operator that is determining the license plate number. This is an example embodiment and is not intended to limit the scope of this disclosure.

Based on the determination in operation 710, the stream operator may perform an operation 715 associating an indication to modify processing the particular tuple at another stream operator. The indication may instruct particular stream operators that the tuple is to remain in the data stream without being processed. The indication may be limited to some of the processing operations within a specific stream operator. In some embodiments, the indication may be limited to a specific stream operator. In other embodiments, the indication may include a group of stream operators. In other embodiments, the indication may apply to one or more levels of stream operators. Additionally, at operation 720, the stream operator may determine whether an indication to modify processing of a particular tuple exists. At operation 725, a stream operator may process and then transmit the tuple according to the operator graph if no indication exists. If an indication does exist, at operation 730 a stream operator may transmit a corresponding tuple according to the operator graph without processing or with modified processing.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud,"

without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

While the foregoing is directed to exemplary embodiments, other and further embodiments of the invention may be devised without departing from the basic scope thereof, and the scope thereof is determined by the claims that follow.

What is claimed is:

1. A method for processing a stream of tuples, comprising:
   receiving a stream of tuples to be processed by a plurality of processing elements operating on one or more computer processors, each processing element having one or more stream operators, a first stream operator configured to associate an indication to tuples that require modified processing and a second stream operator configured to perform a data processing operation;
   receiving a first tuple at the second stream operator;
   first examining, by the second stream operator, the first tuple for the indication;
   performing, by the second stream operator, the data processing operation on first data in response to the receiving the first tuple, the performing the data processing operation based on not detecting the indication during the first examining, the data processing operation modifying the first data in a first manner;
   receiving a second tuple at the second stream operator;
   second examining, by the second stream operator, the second tuple for the indication; and
   performing, by the second stream operator, a modified data processing operation on second data in response to the receiving the second tuple, the performing the modified data processing operation based on detecting the indication during the second examining, the indication having been associated with the second tuple by the first stream operator, the modified data processing operation modifying the second data in a second manner different from the first manner, the second tuple remaining in the stream of tuples after the performing the modified data processing operation.

2. The method of claim 1, further comprising establishing an operator graph of the one or more stream operators, the operator graph defining one or more execution paths in which the first stream operator is configured to receive tuples from one or more upstream stream operators and transmit the tuples to one or more downstream stream operators.

3. The method of claim 1, wherein the performing the modified data processing operation comprises skipping the data processing operation, the method further comprising transmitting the second tuple from the first stream operator to the second stream operator, and transmitting the second tuple from the second stream operator to a third stream operator.

4. The method of claim 3, further comprising receiving the second tuple at the third stream operator and processing the second tuple by the third stream operator.

5. The method of claim 1, wherein the second stream operator is a particular group of two or more stream operators.

6. The method of claim 1, further comprising dividing stream operators into levels, wherein the second stream operator includes all stream operators at a particular level.

7. The method of claim 1, wherein the second stream operator is one level from the first stream operator and a third stream operator is two levels from the first stream operator.

8. The method of claim 1, wherein the first stream operator is configured to perform a first process on a received tuple, the second stream operator is configured to perform a second process on a received tuple, and a third stream operator is configured to perform a third process on a received tuple.

9. The method of claim 1, further comprising:
   receiving the second tuple at the first stream operator;
   determining by the first stream operator that a particular attribute value is present in the second tuple; and
   associating, by the first stream operator, the indication with the second tuple, the associating the indication with the second tuple based on the determining that the particular attribute value is present.

10. The method of claim 1, further comprising:
    receiving the second tuple at the first stream operator;
    determining by the first stream operator that a particular attribute value is missing from the second tuple; and
    associating, by the first stream operator, the indication with the second tuple, the associating the indication with the second tuple based on the determining that the particular attribute value is missing.

11. The method of claim 1, further comprising:
    receiving the second tuple at the first stream operator;
    determining by the first stream operator that the second tuple has been in an operator graph for a time period that exceeds a threshold time period; and
    associating, by the first stream operator, the indication with the second tuple, the associating the indication with the second tuple based on the determining that the time period exceeds the threshold.

12. The method of claim 1, further comprising:
receiving the second tuple at the first stream operator;
associating, by the first stream operator, the indication with the second tuple, wherein the associating the indication with the second tuple includes outputting by the first stream operator a third tuple to the second stream operator.

13. The method of claim 1, wherein the data processing operation comprises two or more processing operations and wherein the modified data processing operation comprises less than all of the two or more processing operations.

14. The method of claim 1, further comprising:
receiving the second tuple at the first stream operator;
determining, by the first stream operator, that a requirement to modify processing of the second tuple by a second stream operator exists, wherein the requirement to modify processing of the second tuple includes a performance condition; and
associating, by the first stream operator, the indication with the second tuple.

15. The method of claim 1, wherein the detecting the indication for a tuple is selected from the group consisting of:
identifying a qualifying header associated with the tuple;
identifying a qualifying trailer associated with the tuple;
identifying qualifying metadata associated with the tuple; and
determining that the tuple satisfies qualifying criteria, the qualifying criteria established by a previously received tuple.

* * * * *